United States Patent [19]

Murphy et al.

[11] Patent Number: 5,860,633
[45] Date of Patent: Jan. 19, 1999

[54] VALVE SEAL

[76] Inventors: Ryan E. Murphy, 72 Park Pl., Pascoag, R.I. 02859; Thomas F. Spock, Jr., 120 Woodbridge Dr., East Greenwich, R.I. 02818; Geoffrey R. McLaughlin, 19 Argricultural Ave., Rehoboth, Mass. 02769

[21] Appl. No.: 738,543

[22] Filed: Oct. 28, 1996

[51] Int. Cl.$^6$ .............................. F16K 41/04; F15J 15/20
[52] U.S. Cl. .......................... 251/214; 277/522; 277/529; 277/531
[58] Field of Search ............................ 251/214; 277/105, 277/106, 123, 124, 125, 522, 529, 531

[56] References Cited

U.S. PATENT DOCUMENTS

| | | | |
|---|---|---|---|
| 841,960 | 1/1907 | Gray | 251/214 |
| 881,687 | 3/1908 | Hoffner | 277/529 |
| 2,094,752 | 10/1937 | Rosenberry et al. | 277/529 |
| 2,158,833 | 5/1939 | Robinson | 277/529 |
| 2,181,748 | 11/1939 | Thaheld | 277/214 |
| 3,132,838 | 5/1964 | Smith | 251/214 |
| 4,451,047 | 5/1984 | Herd et al. | 251/214 |
| 4,462,568 | 7/1984 | Taylor et al. | 251/214 |
| 4,475,712 | 10/1984 | DeJager | 251/214 |
| 4,660,591 | 4/1987 | Brown et al. | 251/214 |
| 4,886,241 | 12/1989 | Davis et al. | 251/214 |
| 5,056,757 | 10/1991 | Wood | 251/214 |
| 5,056,758 | 10/1991 | Bramblet | 251/214 |
| 5,129,624 | 7/1992 | Icenhower et al. | 251/214 |
| 5,129,625 | 7/1992 | Wood et al. | 251/214 |
| 5,178,363 | 1/1993 | Icenhower et al. | 251/214 |
| 5,326,074 | 7/1994 | Spock, Jr. et al. | 251/214 |
| 5,338,004 | 8/1994 | Heil | 251/214 |

FOREIGN PATENT DOCUMENTS

| | | |
|---|---|---|
| 535 735 A | 2/1955 | Belgium . |
| 92 12 452 U | 12/1992 | Germany . |
| 2 242 505 | 10/1991 | United Kingdom . |

OTHER PUBLICATIONS

PCT Search Report, dated 16 Mar. 1998.

*Primary Examiner*—George L. Walton
*Attorney, Agent, or Firm*—Fish & Richardson P.C.

[57] ABSTRACT

A valve assembly configured to maintain a seal during thermal cycling includes a valve body defining a flow passage, and a fluid control member disposed in the flow passage for controlling the flow of fluid. An actuating shaft is interconnected with the fluid control member for moving the fluid control member. A housing including an internal wall defining a shaft bore is connected to the valve body, and the actuating shaft extends through the shaft bore with the internal wall of the housing radially spaced from the actuating shaft to define a sealing cavity. A seal is located within the sealing cavity for inhibiting fluid flow between the actuating shaft and the housing. The seal includes a plurality of first surfaces and the housing defines a plurality of opposed surfaces such that sealing contact of the seal with the actuating shaft and the housing is maintained during thermal cycling.

19 Claims, 3 Drawing Sheets

VALVE SEAL

BACKGROUND OF THE INVENTION

The invention relates to a valve seal of a valve assembly.

As discussed in U.S. Pat. No. 5,056,758 to Bramblet, it has been known to use a "fire-resistant" packing including a first set of packing rings of elastomeric material and a second set of packing rings of graphite composition to provide a valve stem seal at both normal operating temperature conditions and abnormally high temperature conditions.

As discussed in U.S. Pat. No. 5,326,074 to Spock, Jr. et al., in valves designed for use in environments subject to thermal cycling, it has been known to dimension a sealing cavity to compensate for thermally induced relative dimensional changes between metallic structural members and sealing materials.

SUMMARY OF THE INVENTION

According to the invention, a valve assembly configured to maintain a seal during thermal cycling in a range of predetermined temperatures includes a valve body defining an inlet, an outlet, and a flow passage extending therebetween. A housing including an internal wall defining a shaft bore is connected to the valve body. A moveable fluid control member is disposed in the flow passage for controlling the flow of fluid through the valve body, and an actuating shaft is interconnected with the fluid control member for moving the fluid control member between a first, fluid flow permitting position and a second, fluid flow preventing position. The actuating shaft extends through the shaft bore with the internal wall of the housing being radially spaced from the actuating shaft to define a sealing cavity therebetween. A seal is located within the sealing cavity for inhibiting fluid flow between the actuating shaft and the housing. The seal is formed of a material that changes size with temperature and includes a plurality of first surfaces. The housing defines a plurality of opposed corresponding surfaces such that sealing contact of the seal with the actuating shaft and the housing is maintained during thermal cycling within the range of predetermined temperatures.

Preferred embodiments of the invention may include one or more of the following additional features. The plurality of first surfaces are formed by contact under pressure of the seal with the plurality of opposed corresponding surfaces of the housing. The seal includes a primary seal, a secondary seal, and a biaser for loading the primary and secondary seals. The primary seal is formed of the material, e.g., a polytetrafluoroethylene-based material, that changes size with temperature and includes the plurality of first surfaces. The secondary seal is formed of a material, e.g, a graphite-based material, resistant to temperatures above the range of predetermined temperatures such that sealing contact of the secondary seal with the actuating shaft and the housing is substantially maintained at temperatures above the range of predetermined temperatures. The biaser maintains loading of the secondary seal after destruction of the primary seal.

A main seal is located between the valve body and the fluid control member for inhibiting fluid flow therebetween. A body seal is located in a region between the housing and the valve body for inhibiting fluid flow therebetween. The body seal includes a plurality of first surfaces and the housing defines a plurality of opposed corresponding surfaces such that sealing contact of the body seal with the housing and the valve body is maintained during thermal cycling within the range of predetermined temperatures. The plurality of first surfaces are formed by contact under pressure of the body seal with the plurality of opposed corresponding surfaces of the housing.

There is a centering gap between the housing and the valve body. A gap body seal and a seal retainer inhibit fluid flow through the centering gap.

The range of predetermined temperatures is a 300° temperature range (vs. 100° for a standard valve) within the boundary temperatures of −40° F. and 450° F.

Advantages of the invention include protection against fugitive emission release from a valve under both thermal cycling conditions and exposure to fire.

DESCRIPTION OF THE PREFERRED EMBODIMENT

Figure 1:
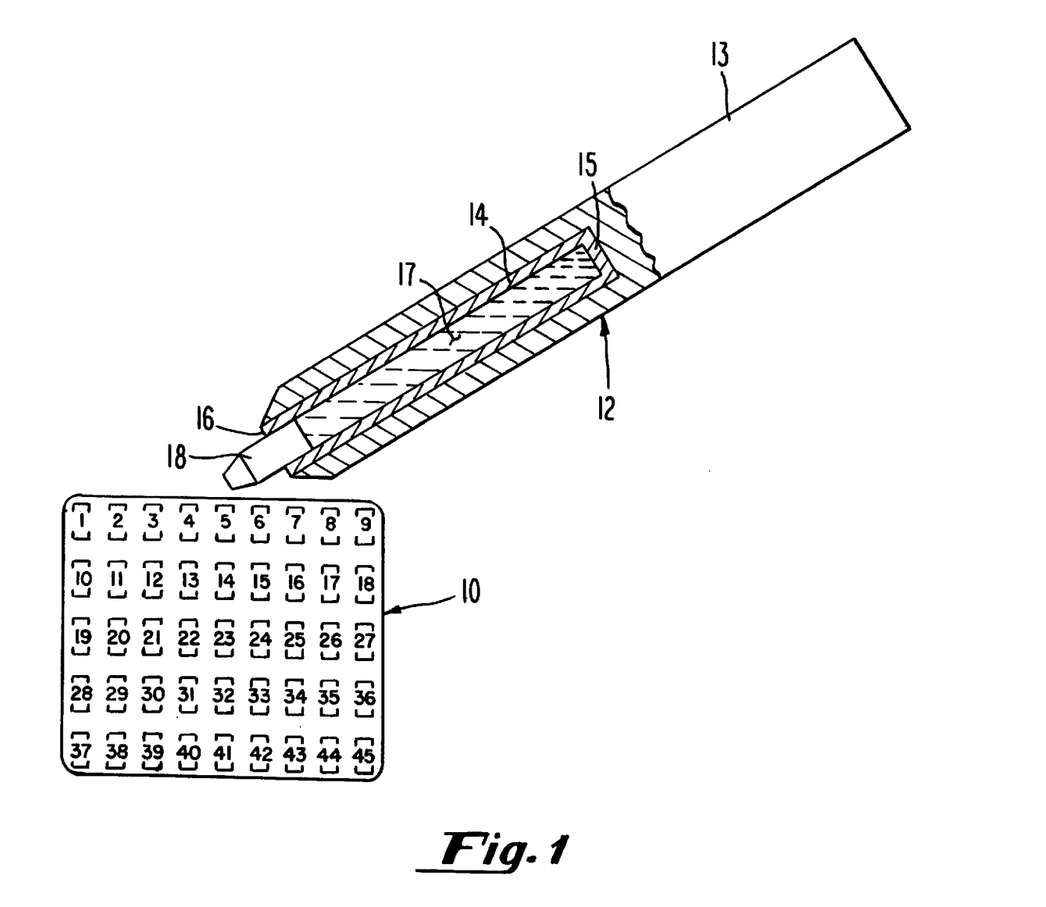
FIG. 1 is a somewhat diagrammatic illustration of a valve assembly of the invention, taken partially in section.

Referring to FIG. 1, a quarter-turn valve 10 includes a valve body 12 defining an inlet 14, an outlet 16, and a flow passage 18 extending therebetween. A housing bonnet 30 is mounted to valve body 12 by four bolts 31, two bolts being shown in the figure. A valve stem 20 is connected to, here shown integral with, a fluid control member 22 disposed in flow passage 18. Fluid control member 22 includes a through channel 24 alignable with flow passage 18 for controlling the flow of fluid through valve body 12. Valve stem 20 further includes an actuating shaft 26 extending within housing 30 and connected to fluid control member 22 for moving the fluid control member between a first, fluid flow permitting position (FIG. 1) in which through channel 24 is aligned with flow passage 18 and a second, fluid flow preventing position (not shown) in which fluid control member 22 has been rotated a quarter turn to place channel 24 out of alignment with flow passage 18.

A sleeve 28 formed from, e.g., an unfilled polytetrafluoroethylene (PTFE) such as virgin PTFE, acts as a bearing surface and as a main valve seal between fluid control member 22 and valve body 12. An upper region 28a of sleeve 28 forms a full circumferential seal with valv body 12 to prevent the passage of fluid axially upward toward valve stem 20. A plug adjuster 52, mounted to housing 30 with bolts 53, is adjustable to produce a desired sealing load on sleeve 28. A packing gland 50, fixedly mounted to housing 30 with bolts 51, produces a desired, predetermined packing load on a valve seal 60, discussed further below.

Figure 2:
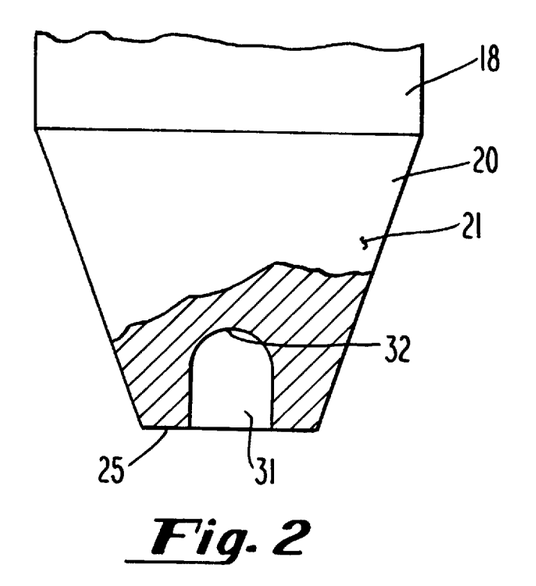
FIG. 2 is a side section view of a housing of the valve assembly of FIG. 1.

Referring to FIG. 2, housing 30 has an internal wall 32 defining a shaft bore 34 for receiving actuating shaft 26. Internal wall 32 is radially spaced from actuating shaft 26 to provide sealing cavities 36, 38 located between wall 32 and shaft 26. The cavities 36, 38 are delineated by shoulder 33. A larger diameter region 35 of wall 32 receives packing gland 50. Housing 30 has a shelf area 40 defining one end of cavity 38 and including a plurality of keyed surfaces, e.g., serrations 42. A valve body contacting surface 44 of housing 30 also includes a region of a plurality of keyed surfaces, e.g. serrations 46.

Figure 3:
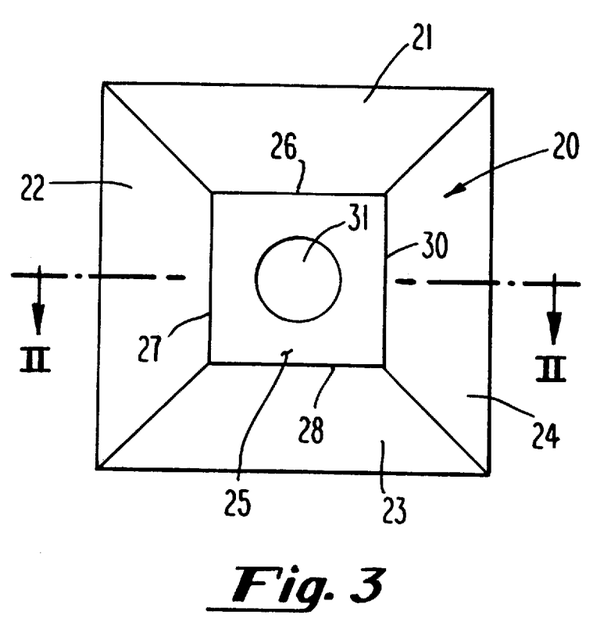
FIG. 3 is a side section view of a seal assembly disposed within the housing of FIG. 2.

Referring to FIGS. 1 and 3, seal assembly 60 for inhibiting fluid flow between shaft 26 and internal wall 32 includes a primary seal 62, formed, e.g., of a chevron-style packing having a lower packing 81 and an upper packing 81a of carbon filled or unfilled PTFE, and v-rings 83 of unfilled PTFE or fluoroelastomer, located within sealing cavity 38; and a secondary seal 64, in the form of, e.g., a flexible graphite based flat seal, located within sealing cavity 36. A stack 66 of non-adjustable Belleville washer-type springs, e.g., three springs, disposed between the primary and secondary seals 62, 64 acts, through follower 68 to load both seals. Follower 68 is formed, e.g., of a metal compatible with the application fluid and resistant to galling on the surfaces of housing 30 and stem 26; nitronic 60 is a preferred material when used with a stainless steel housing and stem. A leak detection port 67 provided in housing 30 between the primary and secondary seals allows monitoring of primary seal performance.

A seal washer 70 is located between stack 66 and secondary seal 64, and a seal retainer 72 is located on the opposite side of secondary seal 64. Both seal washer 70 and seal retainer 72 are formed, e.g., from a suitable non-galling material such as nitronic 60.

The fixed position of packing gland 50 produces a predetermined axial load on primary seal 62 by compression of the belleville spring washer stack 66 to a preestablished stack height. The predetermined load is a function of the stack height, and of the characteristics and stacking scheme of the belleville springs. This axial compression results in radial compression of primary seal 62 producing a seal between stem 26 and housing 30. Primary seal 62 thus performs the function of a back-up seal to the sealing action of sleeve 28. The packing gland also axially compresses secondary seal 64 resulting in radial compression of secondary seal 64 producing an additional seal between stem 26 and housing 30. Secondary seal 64 thus performs the function of a back-up seal to the sealing action of primary seal 62.

Figure 3A:
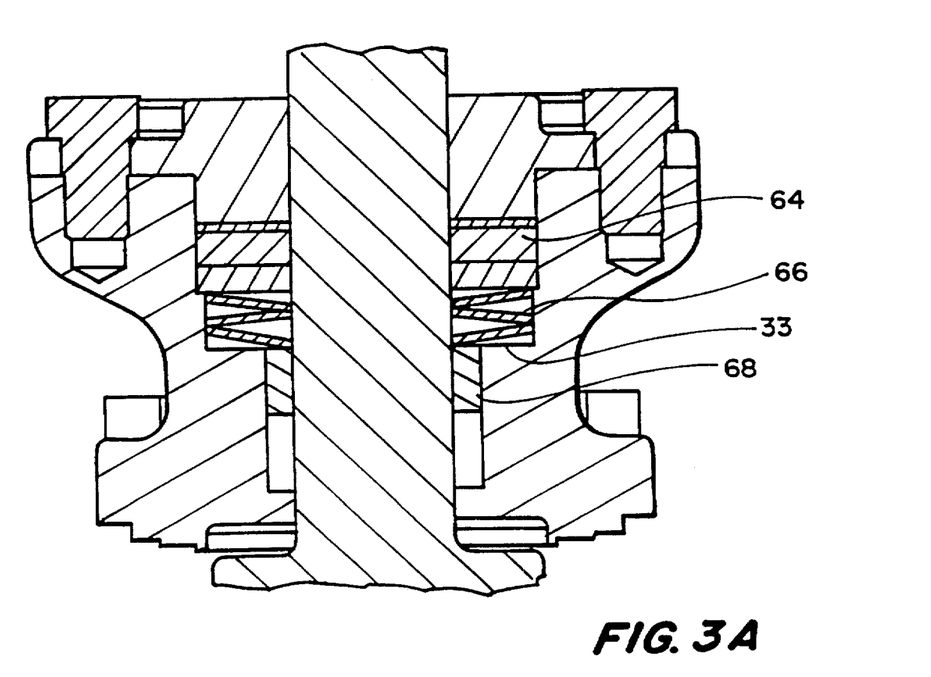
FIG. 3A is a side section view, similar to FIG. 3, with the seal assembly shown after exposure to fire.

Referring to FIG. 3A, in use, if valve 10 is subjected to high temperatures, e.g. above about 700°, such as might be encountered during a fire, and the PTFE-based primary seal 62 is consumed by the heat, the follower 68 is displaced, allowing the stack 66 of belleville washers to bear upon shoulder 33 of shaft bore 34, thereby maintaining a positive seal by continued loading of graphite-based secondary seal 64.

Figure 4:
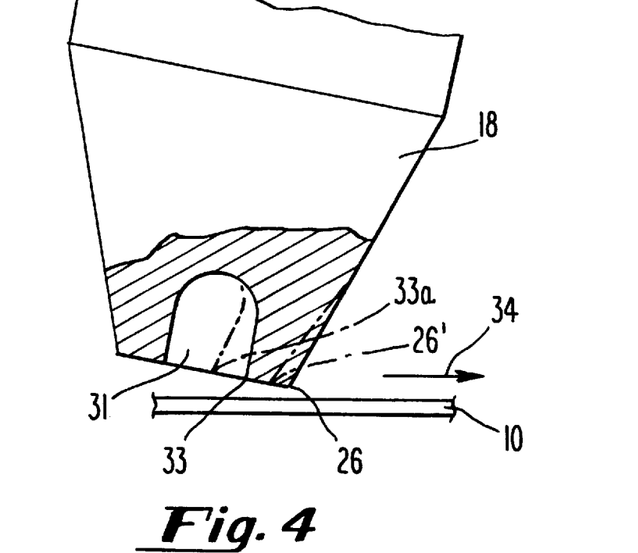
FIG. 4 is an enlarged side section view of region A—A of FIG. 1.
Figure 5:
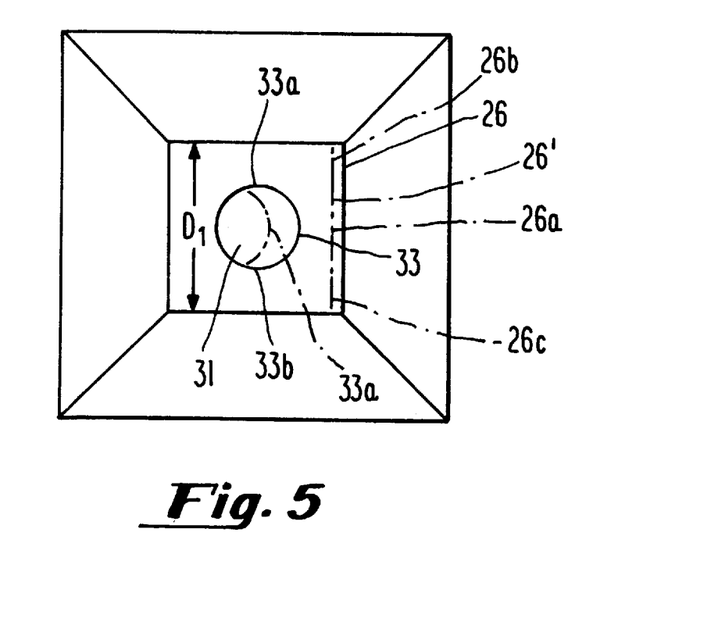
FIG. 5 is a side view of a lower packing of the seal assembly of FIG. 3, shown prior to seal loading.
Figure 5A:
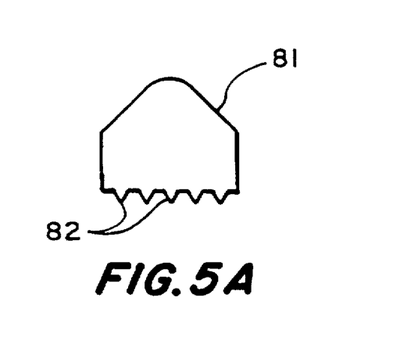
FIG. 5A is a side view of the lower packing of FIG. 5, shown after seal loading.

Referring to FIGS. 4–5A, serrations 42 of shelf area 40 form an impression on a surface 80 of lower packing 81 of primary seal 62 such that, after assembly, the primary seal defines a plurality of opposed keyed surfaces, e.g., serrations 82, disposed in sealing contact with serrations 42 of shelf area 40. These opposed keyed surfaces serve to maintain sealing contact between the primary seal 62 and the opposed shelf surface 40 during thermal cycling, e.g., over a 300° temperature range within the boundary temperatures of –40° F. and 450° F.; the sealing contact being otherwise lost due to the higher rate of change in size of the PTFE based lower packing relative to the surrounding metal parts during cooling.

Between housing 30 and valve body 12, in the region of housing serrations 46, is located a body seal 84, formed, e.g, of unfilled PTFE. Serrations 46 form impressions in an upper surface 85 of body seal 84 such that, after assembly, the body seal defines a plurality of opposed keyed surfaces, e.g., serrations 86, disposed in sealing contact with serrations 46. As in primary seal 62, this sealing configuration maintains sealing contact during thermal cycling, e.g. over a 300° temperature range within the boundary temperatures of –40° F. and 450° F.

Adjacent body seal 84, is a second body seal 88, formed, e.g., of flexible graphite, and a body seal retainer 90 formed, preferably, of the same material, e.g., stainless steel, as valve body 12. Body seal retainer 90 acts as an anti-extrusion ring, permitting a gap 91 between valve body 12 and housing 30 while maintaining the seal between the valve body and housing. Gap 91 allows centralization of housing 30 on valve body 12 which properly positions seals 62, 64.

Other embodiments are within the following claims.

What is claimed is:

1. A valve assembly configured to maintain a seal during thermal cycling in a range of predetermined temperatures, comprising:

a valve body defining an inlet, an outlet, and a flow passage extending therebetween, a housing connected to said valve body, said housing including an internal wall defining a shaft bore, a fluid control member disposed in the flow passage and moveable for controlling the flow of fluid through said valve body, an actuating shaft interconnected with said fluid control member for moving said fluid control member between a first, fluid flow permitting position and a second, fluid flow preventing position, said actuating shaft extending through said shaft bore, said internal wall of said housing being radially spaced from said actuating shaft to define a sealing cavity therebetween, and a seal located within said sealing cavity for inhibiting fluid flow between said actuating shaft and said housing by radial compression of said seal resulting from an applied axial load on said seal, said seal being formed of a material that changes size with temperature, said seal including a plurality of first keyed surfaces located in a region spaced from a point of said applied axial load on said seal, and said housing defining a plurality of opposed corresponding keyed surfaces, said plurality of first keyed surfaces and said plurality of opposed corresponding keyed surfaces disposed in interlocking engagement such that sealing contact of said seal with said actuating shaft and said housing is maintained during thermal cycling within the range of predetermined temperatures.

2. The valve assembly of claim 1 wherein said plurality of first surfaces are formed by contact under pressure of said seal with said plurality of opposed corresponding surfaces of said housing.

3. The valve assembly of claim 1 wherein said seal includes a primary seal, a secondary seal, and a biaser for loading the primary and secondary seals, said primary seal being formed of said material that changes size with temperature and said primary seal including said plurality of first surfaces, said secondary seal being formed of a material resistant to temperatures above the range of predetermined temperatures such that sealing contact of said secondary seal with said actuating shaft and said housing is substantially maintained at temperatures above the range of predetermined temperatures.

4. The valve assembly of claim 3 wherein said biaser maintains loading of said secondary seal after destruction of said primary seal.

5. The valve assembly of claim 3 wherein said material of said primary seal comprises a polytetrafluoroethylene-based material.

6. The valve assembly of claim 3 wherein said material of said secondary seal comprises a graphite-based material.

7. The valve assembly of claim 1 further comprising a main seal located between said valve body and said fluid control member for inhibiting fluid flow between said valve body and said fluid control member.

8. The valve assembly of claim 1 further comprising a body seal located in a region between said housing and said valve body for inhibiting fluid flow between said housing and said valve body, said body seal including a plurality of first surfaces and said housing defining a plurality of opposed corresponding surfaces such that sealing contact of said body seal with said housing and said valve body is maintained during thermal cycling within the range of predetermined temperatures.

9. The valve assembly of claim 8 wherein said plurality of first surfaces of said body seal are formed by contact under pressure of said body seal with said plurality of opposed corresponding surfaces of said housing.

10. The valve assembly of claim 1 further comprising a centering gap between said housing and said valve body.

11. The valve assembly of claim 10 further comprising a gap body seal and a seal retainer for inhibiting fluid flow through said centering gap.

12. The valve assembly of claim 1 wherein said range of predetermined temperatures comprises a 300° temperature range within the boundary temperatures of −40° F. and 450° F.

13. A valve assembly configured to maintain a seal above a range of predetermined temperatures, comprising:

a valve body defining an inlet, an outlet, and a flow passage extending therebetween, a housing connected to said valve body, said housing including an internal wall defining a shaft bore, a fluid control member disposed in the flow passage and moveable for controlling the flow of fluid through said valve body, an actuating shaft interconnected with said fluid control member for moving said fluid control member between a first, fluid flow permitting position and a second, fluid flow preventing position, said actuating shaft extending through said shaft bore, said internal wall of said housing being radially spaced from said actuating shaft to define a sealing cavity therebetween, and a seal assembly located within said sealing cavity for inhibiting fluid flow between said actuating shaft and said housing by radial compression of said seal resulting from an applied axial load on said seal, said seal assembly including a primary seal, a secondary seal, and a biaser for loading the primary and secondary seals, said primary seal being formed of a material that changes size with temperature, said primary seal including a plurality of first keyed surfaces located in a region spaced from a point of said applied axial load on said seal, and said housing defining a plurality of opposed corresponding keyed surfaces, said plurality of first keyed surfaces and said plurality of opposed corresponding keyed surfaces disposed in interlocking engagement such that sealing contact of said primary seal with said actuating shaft and said housing is maintained during thermal cycling within the range of predetermined temperatures, said secondary seal being formed of a material resistant to temperatures above the range of predetermined temperatures such that sealing contact of said secondary seal with said actuating shaft and said housing is substantially maintained at temperatures above the range of predetermined temperatures.

14. The valve assembly of claim 13 wherein said biaser maintains loading of said secondary seal after destruction of said primary seal.

15. The valve assembly of claim 13 wherein said material of said primary seal comprises a polytetrafluoroethylene-based material.

16. The valve assembly of claim 13 wherein said material of said secondary seal comprises a graphite-based material.

17. The valve assembly of claim 13 wherein said range of predetermined temperatures comprises a 280° temperature range within the boundary temperatures of −40° F. and 350° F.

18. A valve assembly configured to maintain a seal in a range of predetermined temperatures, comprising:

a valve body defining an inlet, an outlet, and a flow passage extending therebetween, a housing connected to said valve body, said housing including an internal wall defining a shaft bore, a centering gap located between said housing and said valve body to allow centering said housing on said valve body, a fluid control member disposed in the flow passage and moveable for controlling the flow of fluid through said valve body, an actuating shaft interconnected with said fluid control member for moving said fluid control member between a first, fluid flow permitting position and a second, fluid flow preventing position, said actuating shaft extending through said shaft bore, said internal wall of said housing being radially spaced from said actuating shaft to define a sealing cavity therebetween, a seal positioned within said sealing cavity, facilitated by said centering gap, for inhibiting fluid flow between said actuating shaft and said housing, a body seal located in a first region between said housing and said valve body for inhibiting fluid flow between said housing and said valve body, said body seal including a plurality of first surfaces and said housing defining a plurality of opposed corresponding surfaces, said plurality of first surfaces and said plurality of opposed corresponding surfaces disposed in interlocking engagement such that sealing contact of said body seal with said housing and said valve body is maintained during thermal cycling within the range of predetermined temperatures, and a gap body seal and a seal retainer located in a second region between said housing and said valve body for inhibiting fluid flow through said centering gap.

19. The valve assembly of claim 18 wherein said plurality of first surfaces are formed by contact under pressure of said body seal with said plurality of opposed corresponding surfaces of said housing.

* * * * *

UNITED STATES PATENT AND TRADEMARK OFFICE
CERTIFICATE OF CORRECTION

PATENT NO. : 5,860,633
DATED : Jan. 19, 1999
INVENTOR(S) : Murphy et al.

It is certified that error appears in the above-identified patent and that said Letters Patent is hereby corrected as shown below:

The title page should be deleted to appear as per attached title page.

Please delete drawing sheets 1-3 and substitute drawing sheets 1-4 as per attached.

Signed and Sealed this

Twenty-seventh Day of July, 1999

Attest:

Q. TODD DICKINSON

*Attesting Officer*     *Acting Commissioner of Patents and Trademarks*

United States Patent [19]
Murphy et al.

[11] Patent Number: 5,860,633
[45] Date of Patent: Jan. 19, 1999

[54] VALVE SEAL

[76] Inventors: Ryan E. Murphy, 72 Park Pl., Pascoag, R.I. 02859; Thomas F. Spock, Jr., 120 Woodbridge Dr., East Greenwich, R.I. 02818; Geoffrey R. McLaughlin, 19 Argricultural Ave., Rehoboth, Mass. 02769

[21] Appl. No.: 738,543
[22] Filed: Oct. 28, 1996
[51] Int. Cl.$^6$ ............... F16K 41/04; F15J 15/20
[52] U.S. Cl. ............... 251/214; 277/522; 277/529; 277/531
[58] Field of Search .................. 251/214; 277/105, 277/106, 123, 124, 125, 522, 529, 531

[56] References Cited

U.S. PATENT DOCUMENTS

| | | | |
|---|---|---|---|
| 841,960 | 1/1907 | Gray | 251/214 |
| 881,687 | 3/1908 | Hoffner | 277/529 |
| 2,094,752 | 10/1937 | Rosenberry et al. | 277/529 |
| 2,158,833 | 5/1939 | Robinson | 277/529 |
| 2,181,748 | 11/1939 | Thaheld | 277/214 |
| 3,132,838 | 5/1964 | Smith | 251/214 |
| 4,451,047 | 5/1984 | Herd et al. | 251/214 |
| 4,462,568 | 7/1984 | Taylor et al. | 251/214 |
| 4,475,712 | 10/1984 | DeJager | 251/214 |
| 4,660,591 | 4/1987 | Brown et al. | 251/214 |
| 4,886,241 | 12/1989 | Davis et al. | 251/214 |
| 5,056,757 | 10/1991 | Wood | 251/214 |
| 5,056,758 | 10/1991 | Bramblet | 251/214 |
| 5,129,624 | 7/1992 | Icenhower et al. | 251/214 |
| 5,129,625 | 7/1992 | Wood et al. | 251/214 |
| 5,178,363 | 1/1993 | Icenhower et al. | 251/214 |
| 5,326,074 | 7/1994 | Spock, Jr. et al. | 251/214 |
| 5,338,004 | 8/1994 | Heil | 251/214 |

FOREIGN PATENT DOCUMENTS

| | | |
|---|---|---|
| 535 735 A | 2/1955 | Belgium. |
| 92 12 452 U | 12/1992 | Germany. |
| 2 242 505 | 10/1991 | United Kingdom. |

OTHER PUBLICATIONS

PCT Search Report, dated 16 Mar. 1998.

Primary Examiner—George L. Walton
Attorney, Agent, or Firm—Fish & Richardson P.C.

[57] ABSTRACT

A valve assembly configured to maintain a seal during thermal cycling includes a valve body defining a flow passage, and a fluid control member disposed in the flow passage for controlling the flow of fluid. An actuating shaft is interconnected with the fluid control member for moving the fluid control member. A housing including an internal wall defining a shaft bore is connected to the valve body, and the actuating shaft extends through the shaft bore with the internal wall of the housing radially spaced from the actuating shaft to define a sealing cavity. A seal is located within the sealing cavity for inhibiting fluid flow between the actuating shaft and the housing. The seal includes a plurality of first surfaces and the housing defines a plurality of opposed surfaces such that sealing contact of the seal with the actuating shaft and the housing is maintained during thermal cycling.

19 Claims, 4 Drawing Sheets